US008194764B2

United States Patent
Honda et al.

(10) Patent No.: US 8,194,764 B2
(45) Date of Patent: Jun. 5, 2012

(54) PHASE TRACKING CIRCUIT AND RADIO RECEIVER USING THE SAME

(75) Inventors: Atsushi Honda, Kawasaki (JP); Kaoru Yokoo, Kawasaki (JP); Yoji Ohashi, Kawasaki (JP); Mitsuhiro Azuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 12/324,145

(22) Filed: Nov. 26, 2008

(65) Prior Publication Data

US 2009/0238306 A1    Sep. 24, 2009

(30) Foreign Application Priority Data

Mar. 24, 2008 (JP) ................................. 2008-076221

(51) Int. Cl.
*H04K 1/10* (2006.01)
(52) U.S. Cl. ........................................ 375/260; 375/326
(58) Field of Classification Search .................. 375/260, 375/316, 326; 370/208–210
See application file for complete search history.

(56) References Cited

U.S. PATENT DOCUMENTS

| 7,827,450 B1* | 11/2010 | Yang et al. ...................... 714/704 |
| 2003/0227866 A1* | 12/2003 | Yamaguchi ..................... 370/208 |
| 2004/0008618 A1* | 1/2004 | Shirakata et al. ............. 370/208 |
| 2004/0156309 A1* | 8/2004 | Chadha et al. ................. 370/208 |
| 2004/0161047 A1* | 8/2004 | Liu et al. ......................... 375/260 |
| 2004/0190637 A1* | 9/2004 | Maltsev et al. ................ 375/260 |
| 2005/0100106 A1* | 5/2005 | Chen .............................. 375/260 |
| 2006/0159188 A1* | 7/2006 | Izumi ............................. 375/260 |
| 2006/0182015 A1* | 8/2006 | Kim ............................... 370/203 |
| 2007/0121742 A1* | 5/2007 | Tamaki et al. ................. 375/260 |
| 2007/0133703 A1* | 6/2007 | Kim et al. ...................... 375/260 |
| 2007/0258357 A1* | 11/2007 | Akita ............................. 370/208 |
| 2007/0263743 A1* | 11/2007 | Lee et al. ....................... 375/267 |
| 2008/0118009 A1* | 5/2008 | Chuang et al. ................ 375/340 |
| 2009/0028255 A1* | 1/2009 | Shaw et al. .................... 375/260 |
| 2009/0073869 A1* | 3/2009 | Chadha et al. ................ 370/208 |
| 2009/0168923 A1 | 7/2009 | Imamura et al. |

FOREIGN PATENT DOCUMENTS

| JP | 2001-053712 | 2/2001 |
| JP | 2001127730 | 5/2001 |
| JP | 2002-152167 | 5/2002 |
| JP | 2002261949 | 9/2002 |
| JP | 2004-356923 | 12/2004 |
| JP | 2007-036549 | 2/2007 |
| WO | 2008/010549 | 1/2008 |

OTHER PUBLICATIONS

Notification of Reason(s) for Refusal dated Oct. 25, 2011, from corresponding Japanese Application No. 2008-076221.

* cited by examiner

*Primary Examiner* — Emmanuel Bayard
(74) *Attorney, Agent, or Firm* — Katten Muchin Rosenman LLP

(57) ABSTRACT

A phase tracking circuit includes a divider part dividing an input signal that includes data sub-carriers and pilot sub-carriers into groups so that each of the groups includes at least one of the pilot sub-carriers, and a correcting part correcting phases of data sub-carriers of the input signal included in one of the groups on the basis of an amount of phase rotation of the at least one of the pilot sub-carriers included in the above one of the groups.

13 Claims, 14 Drawing Sheets

US 8,194,764 B2

PHASE TRACKING CIRCUIT AND RADIO RECEIVER USING THE SAME

CROSS-REFERENCE TO RELATED APPLICATION

This application is based upon and claims the benefit of priority of the prior Japanese Patent Application No. 2008-076221, filed on Mar. 24, 2008, the entire contents of which are incorporated herein by reference.

FIELD

The present invention relates to a radio receiver used in radio communication system of multiplex communications.

BACKGROUND

Multi-carrier modulation is known as a modulation/demodulation technique used for radio communication systems realizing multiplex communications. The multi-carrier modulation divides a high-bit-rate data signal (broadband signal) into multiple low-bit-rate data signals that are carried by multiple sub carriers. OFDM (Orthogonal Frequency Division Multiplexing) is a typical multi-carrier modulation in which the frequencies of the sub-carriers are orthogonal to each other, and is adopted in wireless LAN standards such as 802.11a and 802.11g. The sub-carries in transmitted data are closely arranged so as to overlap each other. An FFT (Fast Fourier Transform) circuit of the receiver is capable of separating the sub-carriers from each other.

In OFDM, the receiver has an AFC (Automatic Frequency Control) circuit, which synchronizes the carrier frequencies at the transmitter and receiver sides with each other in order to prevent the sub-carriers from interfering with each other. However, a constant phase rotation is caused in the sub-carriers due to a residual frequency error newly produced during the AFC and phase noise newly applied in frequency conversion. The receiver is thus equipped with a phase tracking circuit for correcting the constant phase rotation. The phase tracking circuit detects the amount of phase rotation using a plot signal that serves as a reference, and corrects the phases of the sub-carriers on the basis of the amount of phase rotation thus detected (see Japanese Patent Application Publication Nos. 2001-53712 and 2001-127730).

More specifically, the conventional phase tracking circuit in the radio receiver averages the amounts of phase rotations detected by using multiple pilot signals included in data in one symbol, and corrects the phases of the sub-carriers using the averaged amount of phase rotation. The above correction may restrain influence of thermal noise. However, there may be great differences in the amount of phase rotation between the multiple sub-carriers in the same symbol in OFDM communications. Particularly, the above problem is conspicuous at frequencies in the millimeter wave range (in the range of 60 GHz). Thus, the averaged amount of phase rotation does not correct the phase rotations of the sub-carriers accurately, and degrades the reception characteristics.

SUMMARY

The present invention has been made in view of the above circumstance, and provides phase tracking capable of restraining degradation of the reception characteristics.

According to an aspect of the present invention, there is provided a phase tracking circuit including: a divider part dividing an input signal that includes data sub-carriers and pilot sub-carriers into groups so that each of the groups includes at least one of the pilot sub-carriers; and a correcting part correcting phases of data sub-carriers of the input signal included in one of the groups on the basis of an amount of phase rotation of said at least one of the pilot sub-carriers included in the above-mentioned one of the groups.

According to another aspect of the present invention, there is provided a radio receiver including: a receiving part receiving an input signal that includes data sub-carriers and pilot sub-carriers; and a phase tracking circuit receiving the input signal, wherein the phase tracking circuit is configured as described.

According to yet another aspect of the present invention, there is provided a signal processing method including: dividing an input signal that includes data sub-carriers and pilot sub-carriers into groups so that each of the groups includes at least one of the pilot sub-carriers; and a correcting part correcting phases of data sub-carriers of the input signal included in one of the groups on the basis of an amount of phase rotation of said at least one of the pilot sub-carriers included in the above-mentioned one of the groups.

According to a further aspect of the present invention, there is provided a non-transitory computer readable medium storing a program causing a computer to execute a process for signal processing, the process including: dividing an input signal that includes data sub-carriers and pilot sub-carriers into groups so that each of the groups includes at least one of the pilot sub-carriers; and correcting phases of data sub-carriers of the input signal included in one of the groups on the basis of an amount of phase rotation of said at least one of the pilot sub-carriers included in the above-mentioned one of the groups.

DESCRIPTION OF EMBODIMENTS

First, a comparative example will be described in order to facilitate better understanding of embodiments of the present invention.

Figure 1:
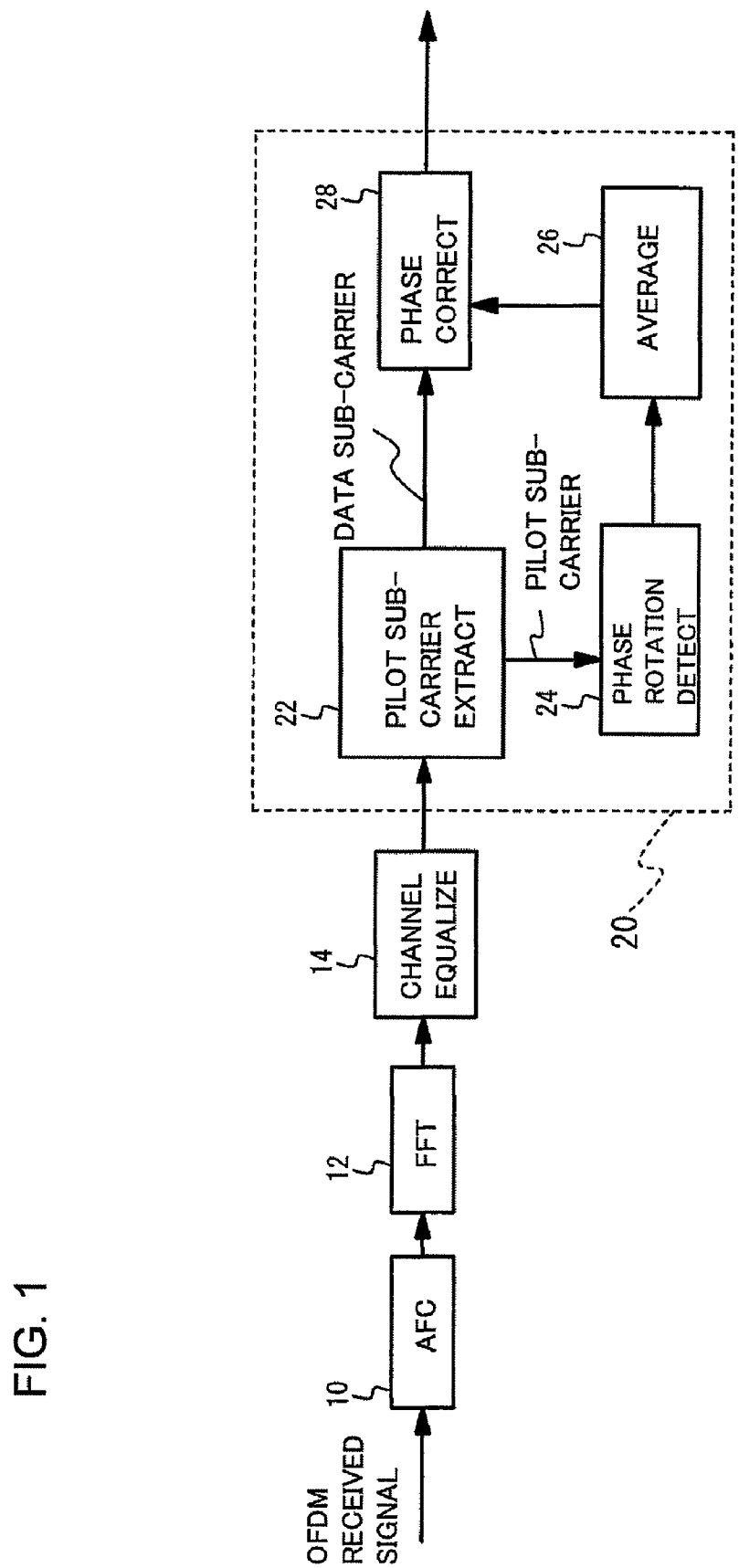
FIG. 1 is a block diagram of a demodulator in a radio receiver of a comparative example.

FIG. 1 is a block diagram of a demodulator in a radio receiver of a comparative example. As depicted in FIG. 1, the demodulator has an AFC circuit 10, an FFT circuit 12, a channel equalizer circuit 14 and a phase tracking circuit 20. The circuits 10, 12 and 14 form a receiving part of the radio receiver. An OFDM signal is applied to the AFC circuit 10, which corrects a carrier frequency error. The FFT circuit 12 demodulates the OFDM signal into sub-carriers. The channel equalizer circuit 14 carries out synchronous detection for the sub-carriers. The equalized signal from the channel equalizer circuit 14 is applied to the phase tracking circuit 20.

Figure 2A:
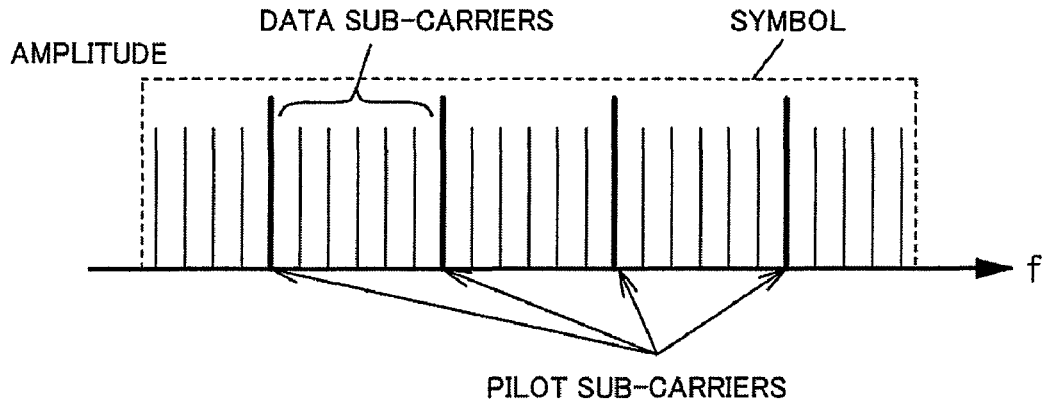
FIGS. 2A through 2C depict a waveform of a transmitted signal in the comparative example.
Figure 2B:
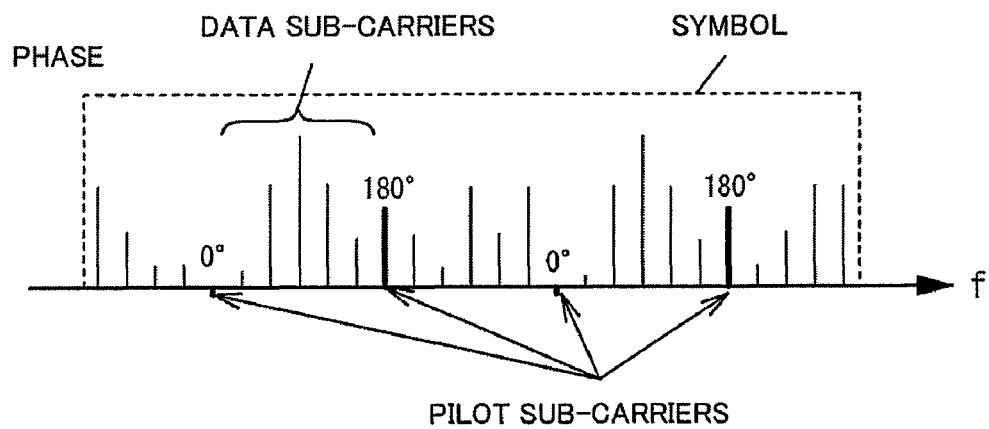
Figure 2C:
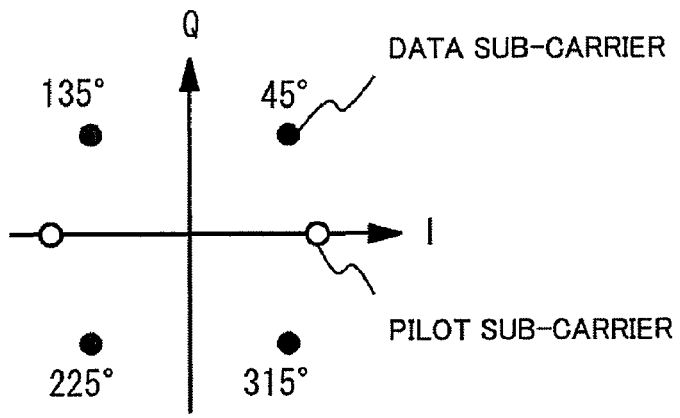

FIGS. 2A through 2C illustrate the amplitude and phase of the waveform of a transmitted signal in the frequency range. The vertical axes of FIGS. 2A and 2B denote the amplitude and phase, respectively, and the horizontal axes thereof denote the frequency. As depicted, multiple data sub-carriers and multiple pilot sub-carriers are included in one symbol. The multiple pilot sub-carriers are known at the receiver side. The pilot sub-carriers are arranged at almost equal intervals every n data sub-carriers where n is a predetermined number. FIG. 2C is a diagram that depicts the amplitude and phase respectively depicted in FIGS. 2A and 2B in the complex plane (I-Q constellation). In FIG. 2C, outline circles denote pilot sub-carriers, and solid circles denote data sub-carriers. In FIG. 2C, only four data sub-carriers are illustrated and the remaining sub-carriers are omitted for the sake of simplicity.

Figure 3:
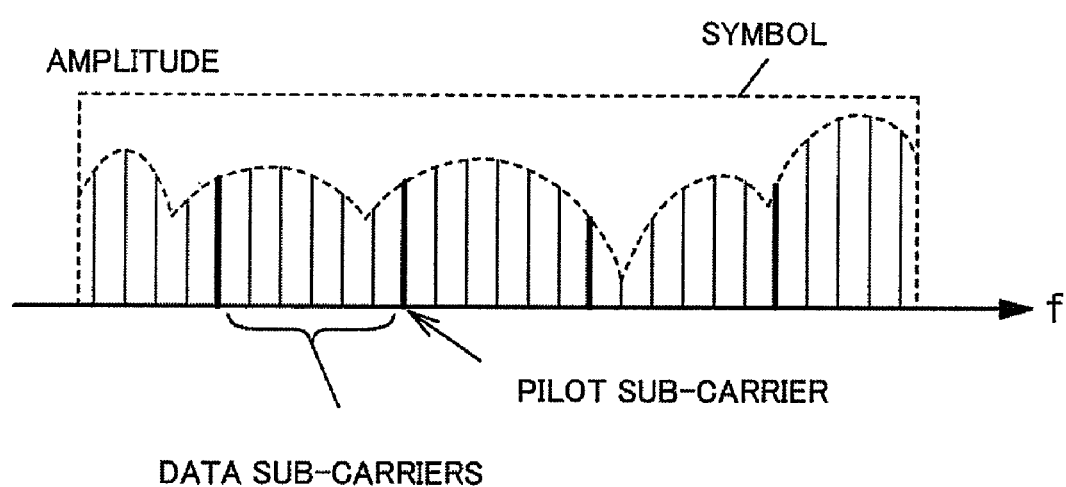
FIG. 3 depicts an output signal of an FFT circuit depicted in FIG. 1.

FIG. 3 illustrates an example of the output of the FFT circuit 12 depicted in FIG. 1, and describes the amplitude of the received signal reproduced by FFT demodulation. The waveform of the received signal is deformed due to multipath fading caused during propagation of the radio signal over different routes.

Figure 4A:
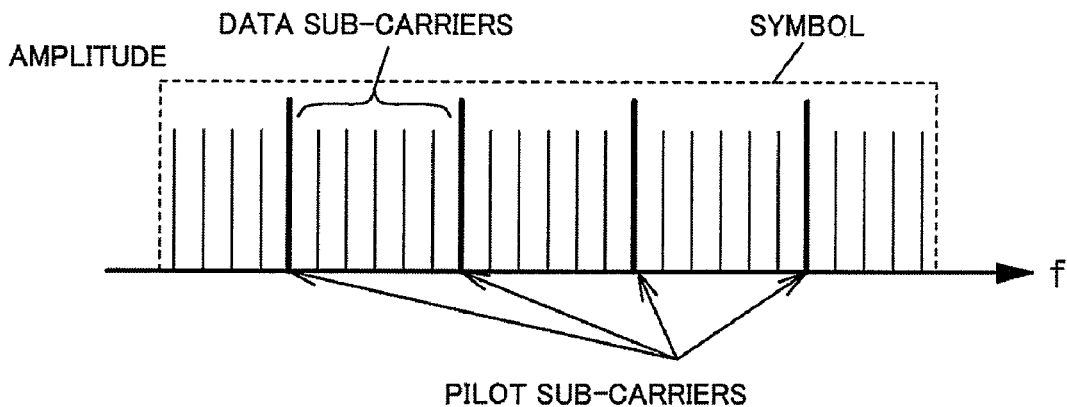
FIGS. 4A through 4C depict an output signal of a channel equalizer circuit depicted in FIG. 1.
Figure 4B:
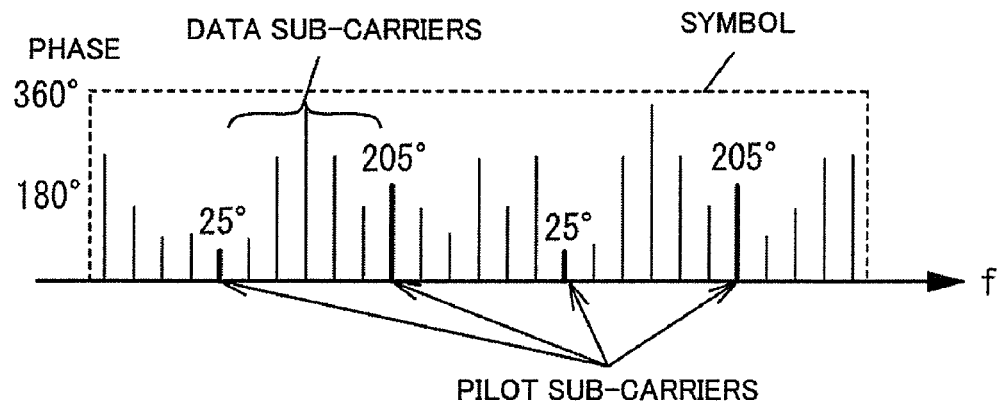
Figure 4C:
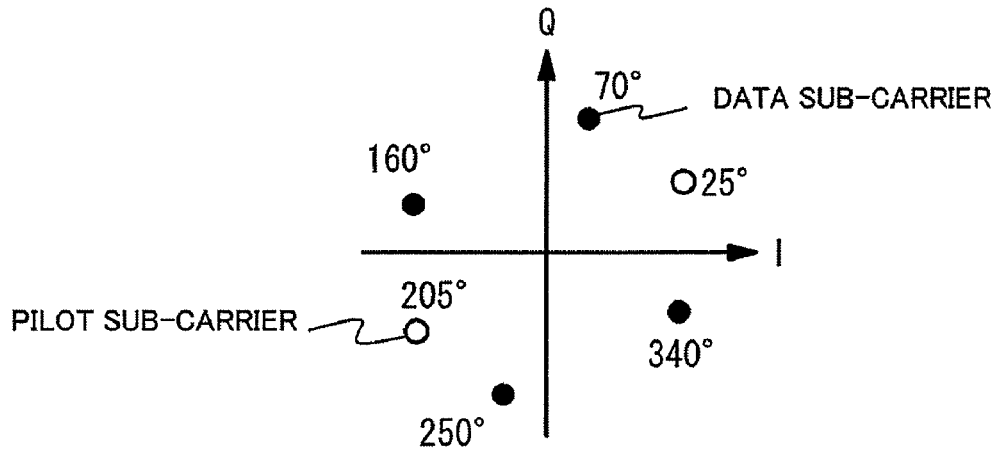

FIGS. 4A through 4C illustrate an example of the output of the channel equalizer circuit 14 illustrated in FIG. 1, and have the same expression ways as those of FIGS. 2A through 2C. Referring to FIG. 4A, the deterioration due to multipath fading depicted in FIG. 3 is removed by the channel equalization process by the channel equalizer circuit 14. Referring to FIGS. 4B and 4C, the pilot sub-carriers and the data sub-carriers have phase deviations due to constant phase rotation, which results from the residual frequency error in the AFC circuit 10 depicted in FIG. 1 and phase noise applied in routes of propagation.

Turning back to FIG. 1, the phase tracking circuit 20 has a pilot sub-carrier extraction circuit 22, an amount-of-phase-rotation detecting circuit 24, an amount-of-phase-rotation averaging circuit 26, and a phase correcting circuit 28. The signal applied to the phase tracking circuit 20 is applied to the pilot sub-carrier extraction circuit 22, which separates the pilot sub-carriers and the data sub-carriers from each other. The pilot sub-carriers are applied to the amount-of-phase-rotation detecting circuit 24, which compares the extracted pilot sub-carriers with the known pilot sub-carriers to thus detect the amounts of phase rotation of the pilot sub-carriers. The amounts of phase rotation thus detected are applied to the amount-of-phase-rotation averaging circuit 26.

The amount-of-phase-rotation averaging circuit 26 averages the amounts of phase rotations of the pilot sub-carriers and thus generates the amount of phase rotation in the whole symbol, which is then applied to the phase correcting circuit 28. The circuit 28 divides the data sub-carriers from the pilot sub-carrier extracting circuit 22 by the amount of phase rotation applied by the amount-of-phase-rotation averaging circuit 26, so that the constant phase rotation in the symbol can be corrected. The output of the phase correcting circuit 28 is applied to a decision circuit (not illustrated for the sake of simplicity) which a decision is made on data.

Figure 5A:
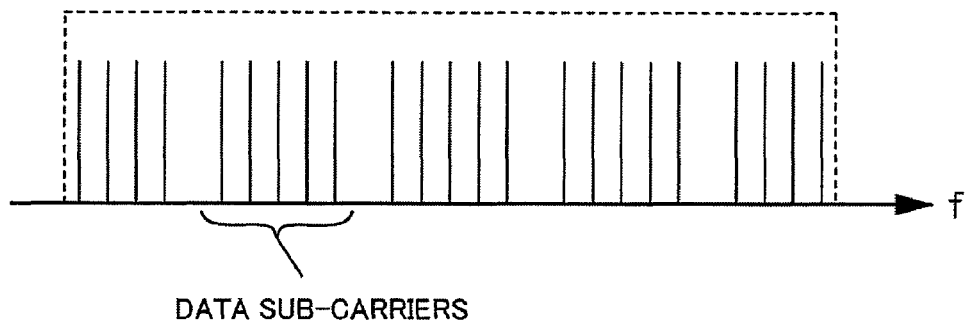
FIGS. 5A through 5C depict an output signal of a pilot sub-carrier extracting circuit depicted in FIG. 1.
Figure 5B:
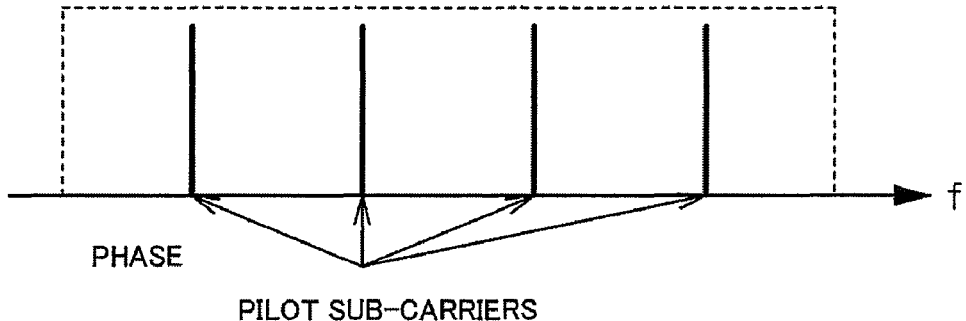
Figure 5C:

FIGS. 5A through 5C illustrate examples of the pilot sub-carriers and the data sub-carriers that are separated by the pilot sub-carrier extracting circuit 22 illustrated in FIG. 1. More particularly, FIG. 5A depicts the amplitudes of the data sub-carriers observed after the pilot sub-carriers have been extracted. FIG. 5B depicts the amplitudes of the extracted pilot sub-carriers, and FIG. 5C depicts the phases thereof.

Figure 6A:
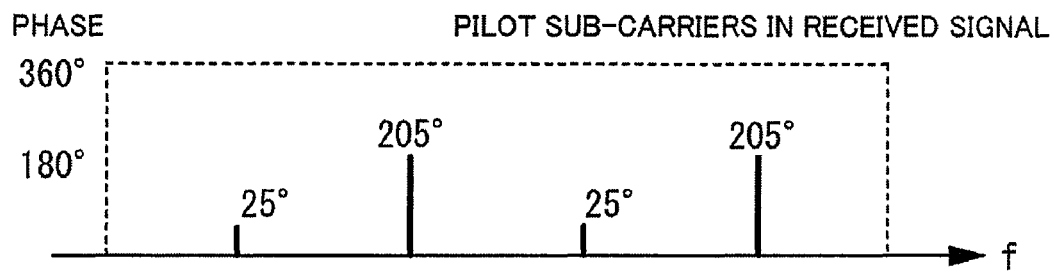
FIGS. 6A through 6C describe a method for detecting the amount of phase rotation in an amount-of-phase-rotation detecting circuit depicted in FIG. 1.
Figure 6B:
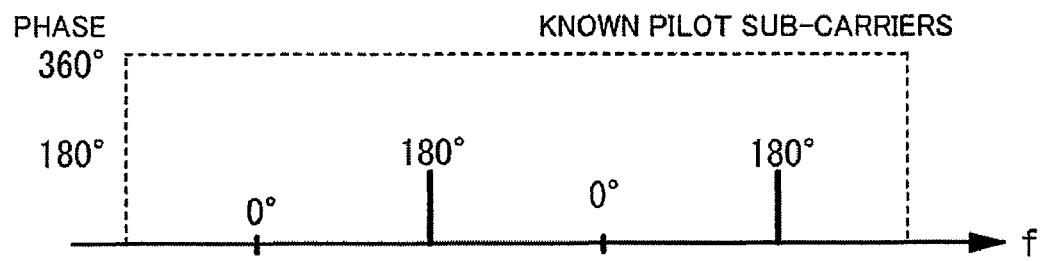
Figure 6C:
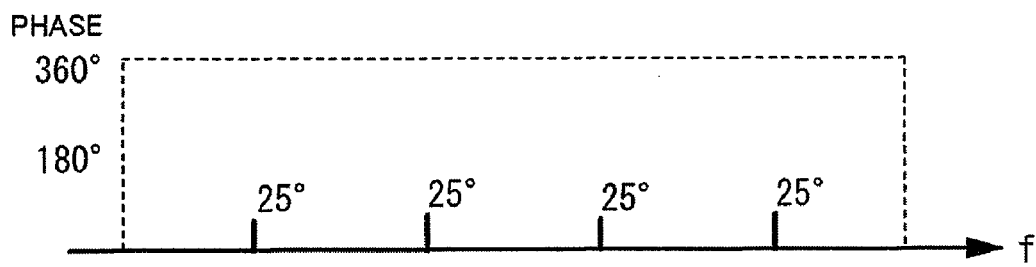

FIGS. 6A through 6C illustrate an example of the output of the amount-of-phase-rotation detecting circuit 24. More particularly, FIG. 6A depicts the phases of the pilot sub-carriers in the received signal, and FIG. 6B depicts the phase of the known pilot sub-carriers. The amounts of phase rotations are detected by comparing the phases illustrated in FIGS. 6A and 6B, as depicted in FIG. 6C. In the example illustrated in FIGS. 6A through 6C, the amount of phase rotation in each comparison is equal to 25 degrees, and the averaged amount of phase rotation is also 25 degrees.

Figure 7A:
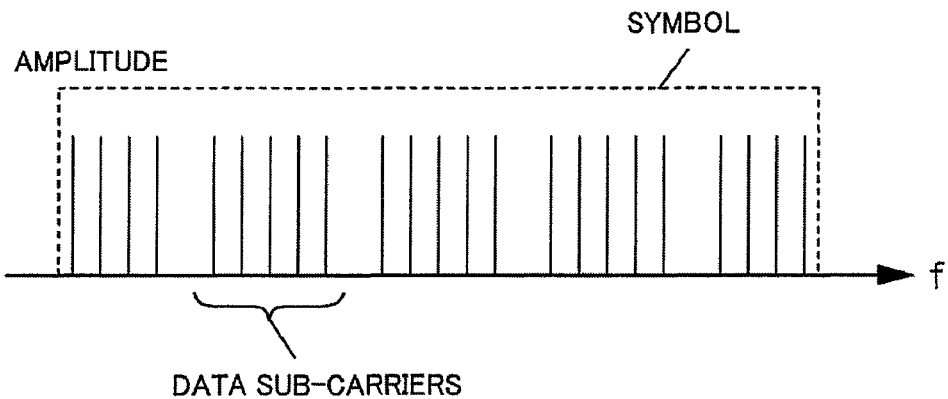
FIGS. 7A through 7C depict an output signal of a phase correcting circuit depicted in FIG. 1.
Figure 7B:
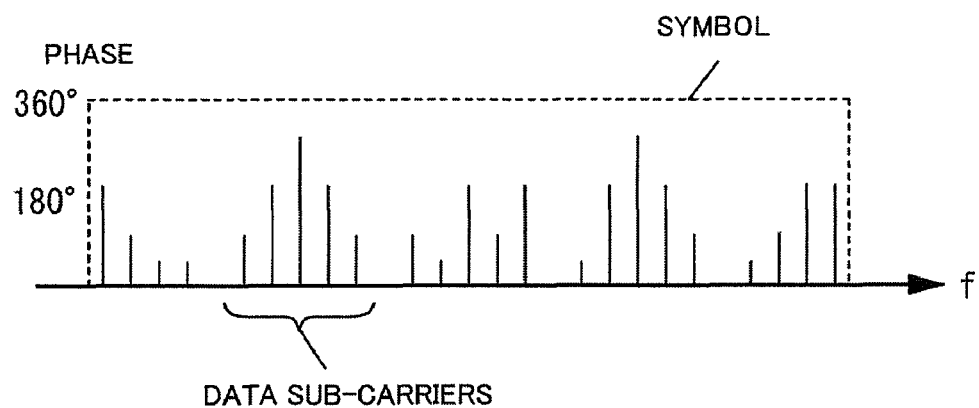
Figure 7C:
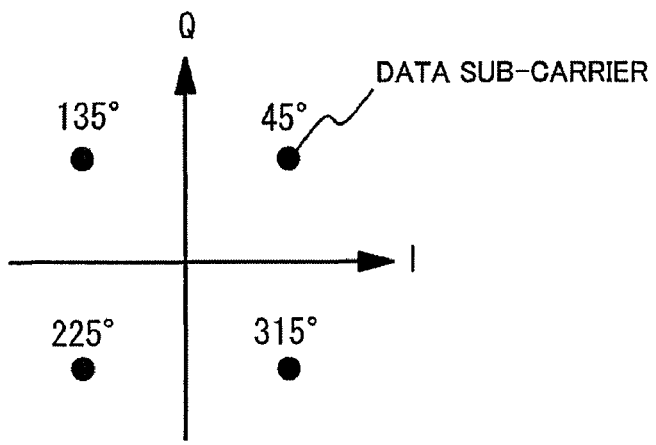

FIGS. 7A through 7C illustrates an example of the output of the phase correcting circuit 28, and have the same expression ways as those of FIGS. 2A through 2C. The output of the phase correcting circuit 28 illustrated in FIGS. 7A and 7B differs from the transmitted signal illustrated in FIGS. 2A and 2B in that the output of the phase correcting circuit 28 does not have the pilot sub-carriers in symbol. The data sub-carriers illustrated in FIGS. 7A through 7C are obtained by dividing the data sub-carriers after channel equalization illustrated in FIGS. 4A through 4C by 25 degrees that is the averaged amount of phase rotation of the data sub-carriers detected in FIG. 6C. Thus, the phases of the data sub-carriers are corrected and are pulled in phase with those of the data sub-carriers in the transmitted signal. It is thus possible to correct the constant phase rotation caused in the received signal by means of the phase tracking circuit 20.

Figure 8A:
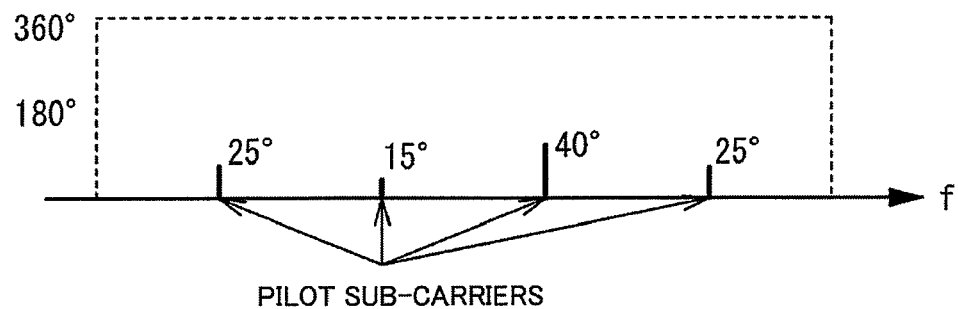
FIGS. 8A through 8C depicts exemplary amounts of phase rotation of pilot sub-carriers in the comparative example.
Figure 8B:
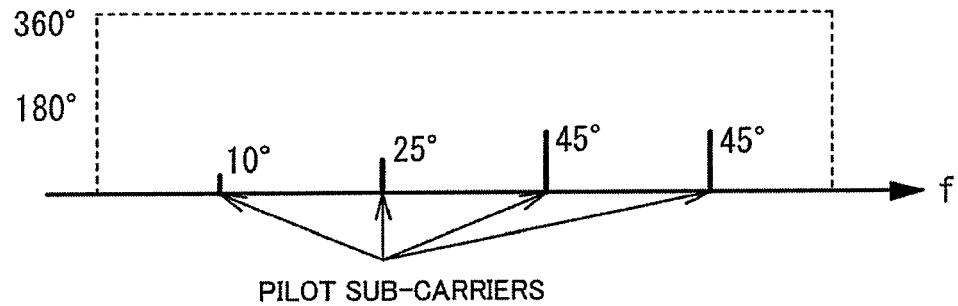
Figure 8C:
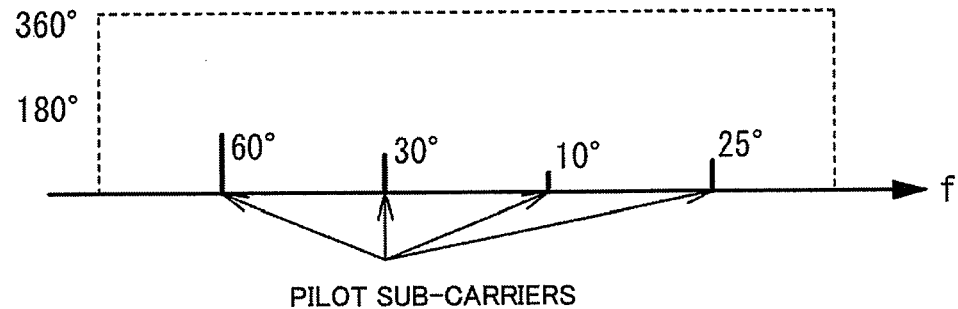

Referring to FIG. 5C, the above-mentioned comparative example assumes that each of the multiple pilot sub-carriers included in one symbol has an equal amount of phase rotation of 25 degrees. However, as described in FIGS. 8A through 8C, the amounts of pilot sub-carriers may not be always equal to each other. Particularly, in OFDM communications at frequencies in the millimeter wave range (in the range of 60 GHz), there are increased differences in the amount of phase rotation between the sub-carriers in the identical symbol. For example, in FIG. 8C, there is a phase difference of 50 degrees between the first and third pilot sub-carriers. In such a case, it may be not appropriate to correct the constant phase rotation by using the averaged amount of phase rotation of the multiple pilot sub-carriers. In some cases, the compensation for the constant phase rotation may increase error and degrade the reception characteristics.

Embodiments of the present invention that will be described below are capable of restraining degradation of the reception characteristics due to the residual frequency error and phase noise even when there are great differences in the amount of phase rotation between sub-carriers within an identical symbol.

First Embodiment

Figure 9:
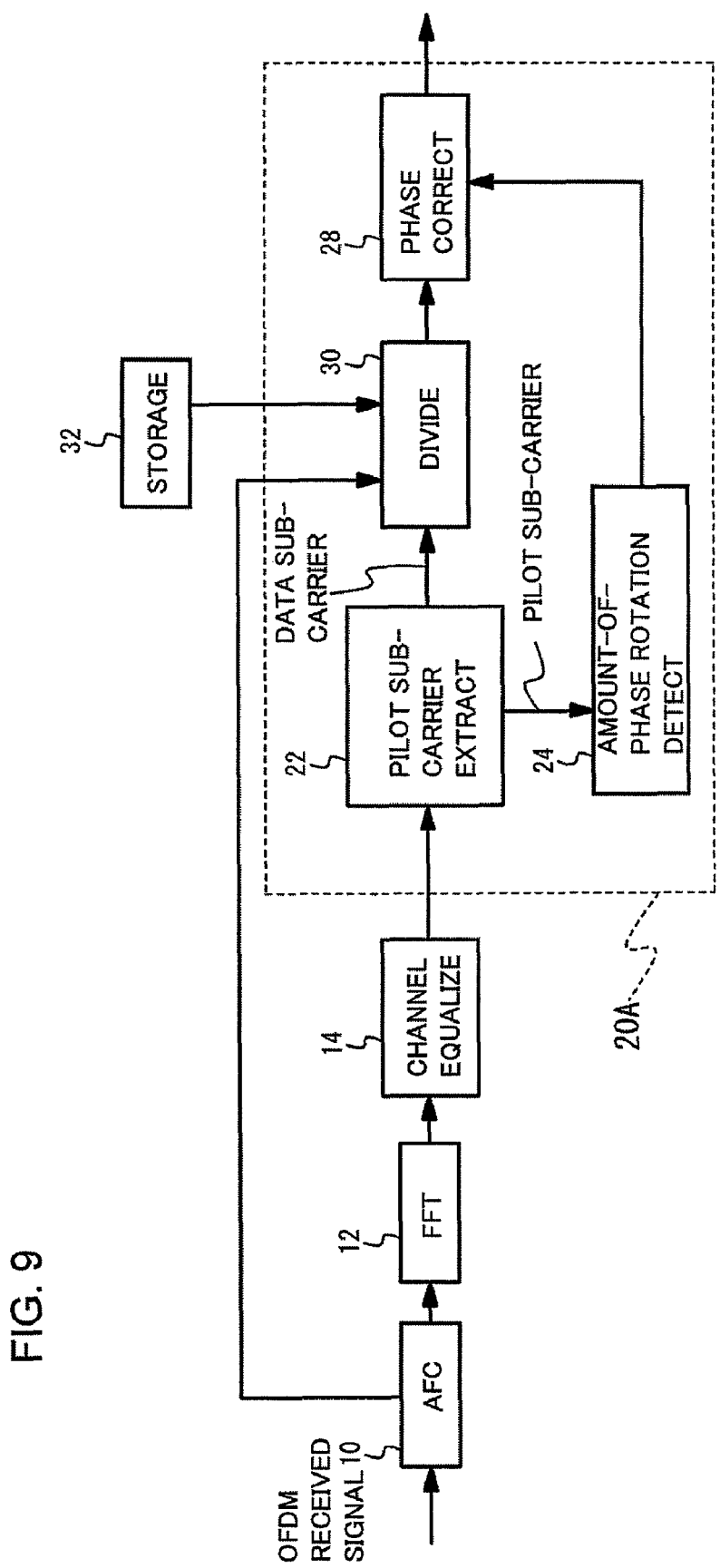
FIG. 9 is a block diagram of a radio receiver in accordance with a first embodiment.

FIG. 9 is a block diagram of a demodulator part of a radio receiver in accordance with a first embodiment of the present invention. In FIG. 9, parts that are the same as those depicted in FIG. 1 are given the same reference numerals, and a description thereof is omitted here. The configuration illustrated in FIG. 9 differs from that depicted in FIG. 1 in that a phase tracking circuit 20A differs from the phase tracking circuit 20. The phase tracking circuit 20A has a divider circuit 30 interposed between the pilot sub-carrier extraction circuit 22 and the phase correcting circuit 28. The divider circuit 30 is connected to a storage device 32 and is supplied with synchronous information (information at a head position of the symbol) from the AFC circuit 10. The phase tracking circuit 20A differs from the phase tracking circuit 20 illustrated in FIG. 1 in that the phase tracking circuit 20A is not equipped with the amount-of-phase-rotation averaging circuit 26. The phase tracking circuit 20A may be implemented by a processor that operates in accordance with a program installed in a computer readable recording medium provided inside or outside of the processor.

Figure 10:
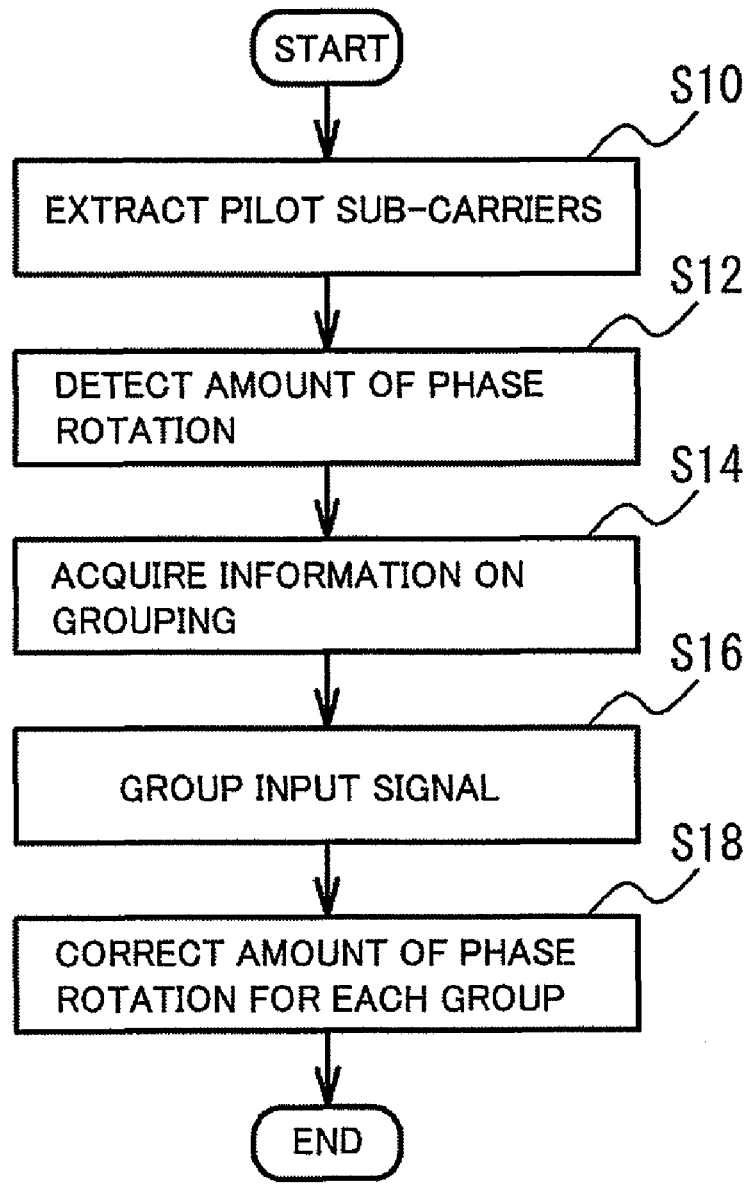
FIG. 10 is a flowchart of signal processing in the radio receiver of the first embodiment.

FIG. 10 is a flowchart that describes a flow of signal processing in the phase tracking circuit 20A. Referring to FIGS. 9 and 10, the pilot sub-carrier extracting circuit 22 extracts the pilot sub-carriers from the input signal (step S10). Next, the amount-of-phase-rotation detecting circuit 24 detects the amounts of phase rotation of the pilot sub-carriers extracted by the sub-carrier extracting circuit 22 (step S12). Then, the divider circuit 30 acquires information on grouping from the storage device 32 and the AFC circuit 10 (step S14), and divides the input signal (symbol) into groups on the basis of the information on grouping (step S16). After that, the phase correcting circuit 28 corrects the phases of the data sub-carriers on the basis of the amounts of phase rotation of the involved pilot sub-carrier detected at step S12 (step S18). The phase correction is carried out for each of the groups defined at step S16.

Figure 11A:
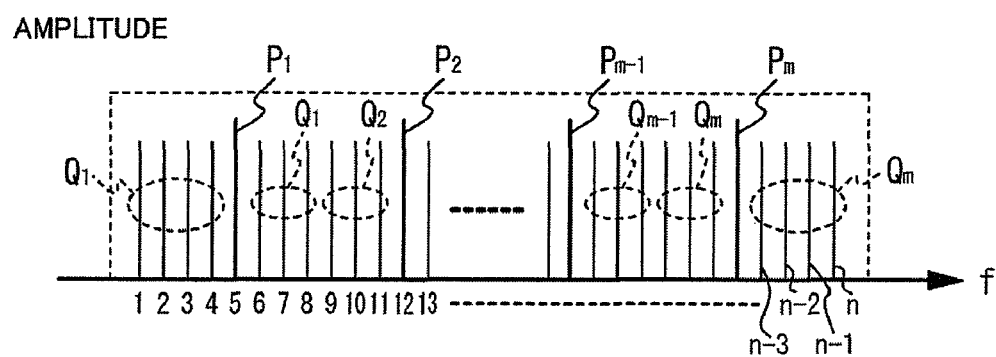
FIGS. 11A and 11B depict signal processing in the radio receiver of the first embodiment in detail.

A further description will now be given, with reference to FIGS. 11A and 11B, of the signal processing in the phase tracking circuit 20A. FIG. 11A illustrates the grouping process carried out at step S16 depicted in FIG. 10, and depicts the waveform of the input signal applied to the phase tracking circuit 20A. As illustrated, the sub-carriers in which the data sub-carriers and the pilot sub-carriers are combined are assigned sub-carrier numbers 1 through n in increasing order of frequency. The pilot sub-carriers are assigned pilot numbers 1 through m in increasing order of frequency (m<n). The sub-carrier numbers 1-$n$ and the pilot numbers 1-$m$ are stored in the storage device 32, which may be a non-volatile semiconductor memory. The divider circuit 30 associates the above-mentioned numbers with the actual input signal on the basis of the information at the head position supplied from the AFC circuit 10.

Referring to FIG. 11A, data sub-carriers (sub-carrier numbers 1-4) of frequencies lower than the frequency of the pilot sub-carrier $P_1$ is classified into group $Q_1$. Data sub-carriers (sub-carrier numbers n-n-3) of frequencies higher than the frequency of the pilot sub-carrier $P_m$ are classified into group $Q_m$. The sub-carriers between the pilot sub-carriers $P_1$ and $P_2$ are classified so that those assigned sub-carrier numbers 6-8 are classified into group $Q_1$ and those assigned sub-carrier numbers 9-11 are classified into group $Q_2$. Grouping for the other sub-carriers is carried out on the basis of the average of the frequencies of the adjacent pilot sub-carriers. That is, the sub-carriers between the pilot sub-carriers $P_{k-1}$ and $P_k$ (k is an integer equal to or smaller than m) are classified so that those assigned sub-carrier numbers less than $(P_{k-1}+P_k)/2$ is classified into group $Q_{k-1}$, and those assigned sub-carrier numbers greater than $(P_{k-1}+P_k)/2$ is classified into group $Q_k$ where $P_{k-1}$ and $P_k$ are respectively sub-carrier numbers of pilot sub-carriers $P_{k-1}$ and $P_k$.

By the above-mentioned process, the data sub-carriers in the symbol are classified into groups $Q_1$ through $Q_m$. In FIG. 11A, the number of groups is equal to the number of pilot sub-carriers, and grouping is performed so that each group has one pilot sub-carrier.

Figure 11B:
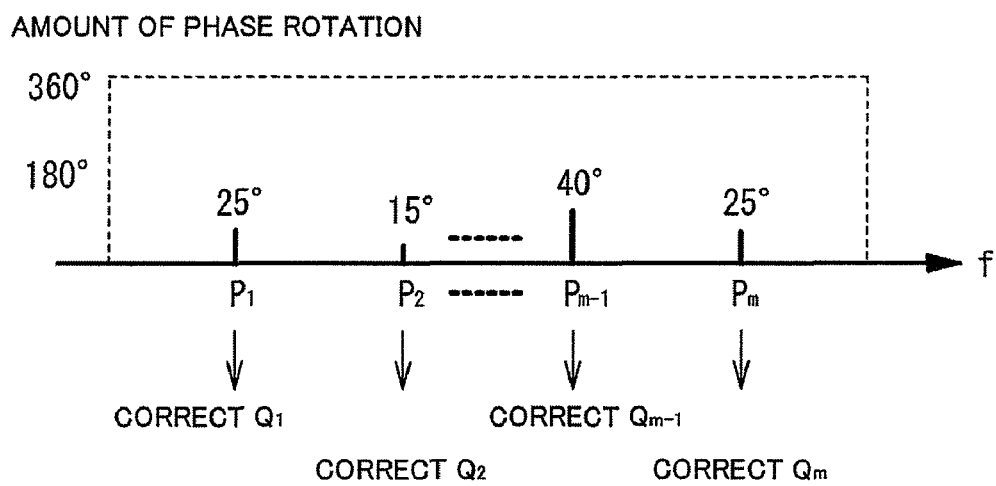

FIG. 11B illustrates an example of the phase correcting process performed at step S18. A graph of FIG. 11B shows the amounts of phase rotation of pilot sub-carriers $P_1$ through $P_m$. The phase correcting circuit 28 depicted in FIG. 9 corrects the constant phase rotations of the data sub-carriers included in the group $Q_1$ on the basis of the amount of phase rotation of the pilot sub-carrier $P_1$. Here, the amount of phase rotation of the pilot sub-carrier $P_1$ is 25 degrees, and the amount of phase rotation of group $Q_1$ is corrected by −25 degrees. Similarly, for groups $Q_2$ through $Q_m$, the phase rotations are corrected by referring to the pilot sub-carriers $P_2$ through $P_m$.

As described above, the phase tracking circuit 20A depicted in FIG. 9 includes the divider part (divider circuit 30) that divides the input signal that includes the data sub-carriers and the pilot sub-carrier into multiple groups, and the correcting part (phase correcting circuit 28) that corrects the phases of the data sub-carriers on the basis of the amount of phase rotation of the pilot sub-carrier. Grouping is designed so that each group includes at least one pilot sub-carrier, and the phases of the data sub-carriers are corrected on the basis of the amount of phase rotation of the pilot sub-carrier included in the same group. Since the constant phase rotation is corrected on the group basis, it is possible to reduce mismatch in the amount of phase-rotation between the pilot sub carriers and the data sub-carriers. Thus, even if there are great differences in the amount of phase rotation between the sub-carriers in the identical symbol, it is possible to restrain degradation of the reception characteristics due to the residual frequency error and phase noise. Particularly, when grouping is performed so that each group includes one pilot sub-carrier as in the case of the first embodiment, it is possible to further reduce mismatch between the pilot sub-carriers and the data sub-carriers, as compared to a second embodiment, which will be described later and to further restrain degradation of reception characteristics.

The signal processing method illustrated in FIG. 10 includes the step (step S16) of dividing the input signal that includes the data sub-carriers and the pilot sub-carrier into multiple groups each having at least one pilot sub-carrier, and the step (step S18) of correcting the phases of the data sub-carriers included in the same group as the pilot sub-carrier on the basis of the amount of phase rotation of the pilot sub-carrier. The phase tracking circuit 20A illustrated in FIG. 9 has an exemplary configuration of implementing the signal processing method depicted in FIG. 10, which may be implemented by another circuit configuration or apparatus. The signal processing including steps S16 and S18 depicted in FIG. 10 may be stored in a given memory (for example, a non-volatile memory in the radio receiver) in the form of a program. The program is read from the memory as necessary, and the signal processing can be executed on the radio receiver.

Second Embodiment

Figure 12:
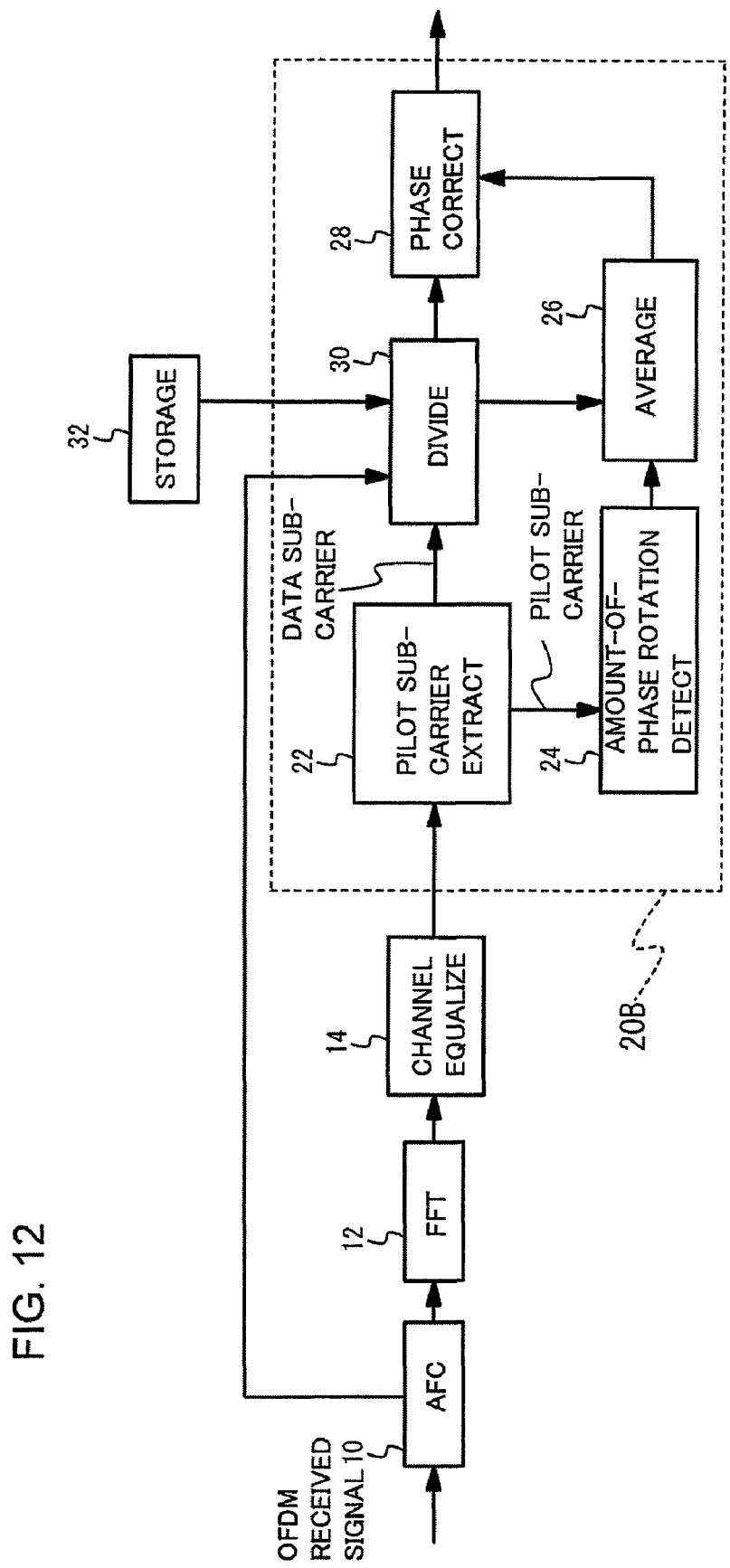
FIG. 12 is a block diagram of a radio receiver in accordance with a second embodiment.

A second embodiment employs grouping so that two or more pilot sub-carriers are included in one group. FIG. 12 is a block diagram of an exemplary configuration of a decoder part of a radio receiver in accordance with the second embodiment. In FIG. 12, parts that are the same as those depicted in FIG. 9 (first embodiment) are given the same reference numerals, and a detailed description thereof is omitted here. The configuration illustrated in FIG. 12 differs from that in FIG. 9 in that the configuration in FIG. 12 is equipped with a phase tracking circuit 20B that is different from the phase tracking circuit 20A illustrated in FIG. 9. The phase tracking circuit 20B has the amount-of-phase-rotation averaging circuit 26 that is used in the configuration depicted in FIG. 1. The amount-of-phase-rotation averaging circuit 26 is supplied with the outputs of the amount-of-phase-rotation detecting circuit 24 and the divider circuit 30. The output of the amount-of-phase-rotation averaging circuit 26 is applied to the phase correcting circuit 28.

Figure 13:
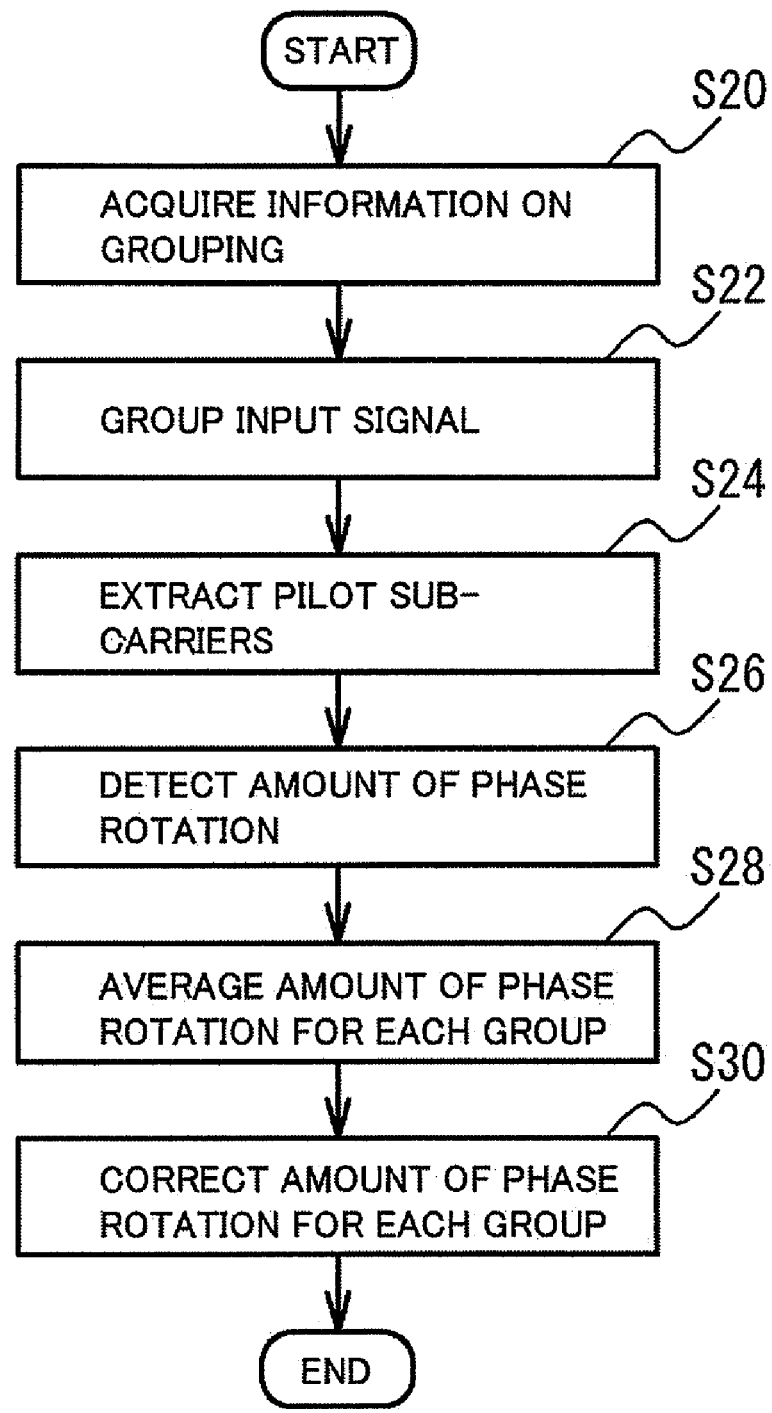
FIG. 13 is a flowchart of signal processing in the radio receiver of the second embodiment.

FIG. 13 is a flowchart of signal processing in the phase tracking circuit 20B. Referring to FIGS. 12 and 13, the divider circuit 30 acquires information on grouping from the storage device 32 and the AFC circuit 10 (step S20), and divides the input signal (symbol) into multiple groups on the basis of the information on grouping (step S22). Next, the pilot sub-carrier extracting circuit 22 extracts the pilot sub-carriers from the input signal (step S24). Then, the amount-of-phase-rotation detecting circuit 24 detects the amounts of phase rotation of the extracted pilot sub-carriers (step S26). Thereafter, the amount-of-phase-rotation averaging circuit 24 averages the amounts of phase rotation of the pilot sub-carriers detected at step S26 for each of the divided groups obtained at step S22 (step S28). Finally, the phase correcting circuit 28 corrects the phases of the data sub-carriers on the basis of the averaged amount of phase rotation of the pilot sub-carriers obtained on the group basis at step S28 (step S30). The phase correction is carried out for each of the divided groups obtained at step S22.

Figure 14A:
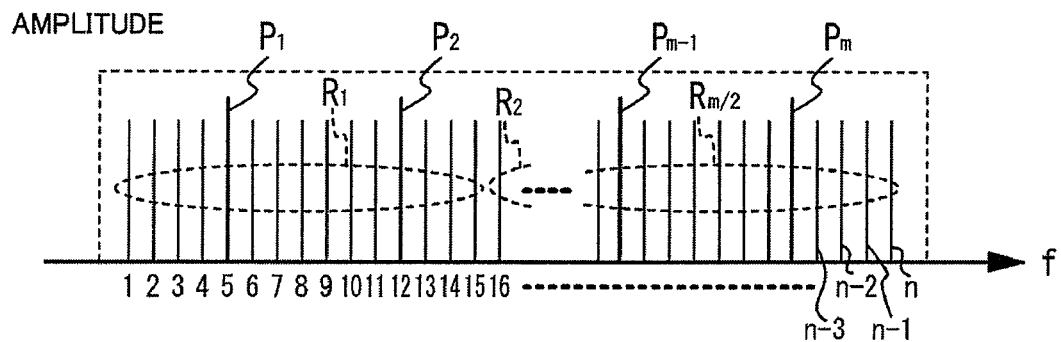
FIGS. 14A and 14B depict signal processing in the radio receiver of the second embodiment in more detail.
Figure 14B:
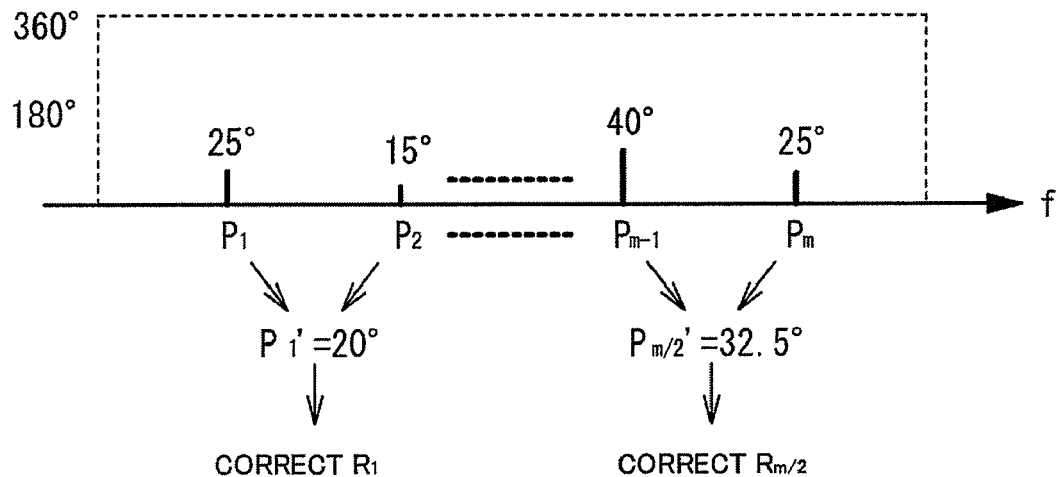

Referring to FIGS. 14A and 14B, a further description will be given of the signal processing by the phase tracking circuit 20B. FIG. 14A illustrates the dividing process at step S22 in FIG. 13, and depicts the waveform of the input signal applied to the phase tracking circuit 20B. As in the case depicted in FIG. 11A, the sub-carriers are respectively assigned sub-carrier numbers 1-$n$, and the pilot sub-carriers are respectively assigned pilot numbers 1-$m$.

Referring to FIG. 14A, the sub-carriers that are assigned sub-carrier numbers 1 through 15 and include pilot sub-carriers $P_1$ and $P_2$ are classified into an identical group $R_1$. That is, groups $Q_1$ and $Q_2$ in FIG. 11A belong to the identical group $R_1$. Similarly, adjacent groups $Q_{k-1}$ and $Q_k$ (k is an integer equal to or smaller than m) belong to an identical group $R_{k/2}$. By the above process, the data sub-carriers in the symbol of concern are classified into groups $R_1$ through $R_{m/2}$. In a way different from that of FIG. 11A, grouping depicted in FIG. 14A is performed so that two pilot sub-carriers are included in each group.

FIG. 14B illustrates the averaging at step S28 depicted in FIG. 13 and phase correcting at step S30 depicted therein, and the graph of FIG. 14B indicates the amounts of phase rotation of the pilot sub-carriers $P_1$ through $P_m$. The amount-of-phase-rotation averaging circuit 26 depicted in FIG. 12 averages the amounts of phase rotation of the pilot sub-carriers included in the same group. For instance, the amount-of-phase-rotation averaging circuit 26 averages the amounts of phase rotation of the pilot sub-carriers $P_1$ and $P_2$ included in the group $R_1$ and calculates an averaged amount $P_1'$ of phase rotation of the group $R_1$. Here, the amount of phase rotation of $P_1$ is 25 degrees, and that of $P_2$ is 15 degrees, so $P_1'=(25°+15°)/2=20°$. Similarly, the adjacent pilot sub-carriers in each of the other identical groups are averaged so as to obtain the averaged amounts of phase rotation of the other groups, namely, $P_2'$ through $P_{m/2}'$.

The phase correcting circuit 28 depicted in FIG. 12 corrects the constant phase rotations of the data sub-carriers in each of the groups $R_1$ through $R_{m/2}$ on the basis of the averaged amounts of phase rotations $P_1'$ through $P_{m/2}'$ obtained by the amount-of-phase-rotation averaging circuit 26. For example, the averaged amount of phase rotation for group $R_1$ is 20 degrees, and the amounts of phase rotation of the data sub-carriers (sub-carrier numbers 1 through 15) included in group $R_1$ are corrected by −20 degrees.

As described above, the divider circuit 30 depicted in FIG. 12 (second embodiment) performs grouping so that each group includes two pilot sub-carriers. Thus, it is possible to reduce the number of groups and reduce the amount of calculation, as compared to the first embodiment. The method of grouping for symbol is not limited to the first and second embodiments. For example, grouping may be performed so that one group includes at least two pilot sub-carriers, that is, three or more pilot sub-carriers. The different groups may have different number of pilot sub-carriers.

The phase correcting circuit 28 depicted in FIG. 12 performs the phase correction of the data sub-carriers on the basis of the averaged amounts of phase rotation of the pilot sub-carriers included in the identical group. Besides the above, the phase correction may be made on the basis of the amount of phase rotation of an arbitrary one pilot sub-carrier within the group. When two or more pilot sub-carriers are included in one group, the use of the averaged amount of phase rotation makes it possible to more precisely correct the constant phase rotation on the group basis.

The present invention is not limited to the specifically disclosed embodiments, but other embodiments and variations may be made without departing from the scope of the present invention. The present invention includes a system having the radio receiver of the first or second embodiment and a radio transmitter of OFDM type.

The invention claimed is:

1. A phase tracking circuit comprising:
a divider configured to divide a symbol of an input signal that includes data sub-carriers and pilot sub-carriers into groups so that each of the groups includes at least one of the pilot sub-carriers; and
a corrector configured to correct phases of data sub-carriers of the input signal included in one of the groups on the basis of an amount of phase rotation of said at least one of the pilot sub-carriers included in said one of the groups.

2. The phase tracking circuit according to claim 1, wherein the divider divides the symbol of the input signal into groups so that each of the groups includes one of the pilot sub-carriers.

3. The phase tracking circuit according to claim 1, wherein the divider divides the symbol of the input signal into groups so that each of the groups includes at least two of the pilot sub-carriers.

4. The phase tracking circuit according to claim 3, wherein the corrector corrects the phases of the data sub-carriers on the basis of an averaged amount of phase rotations of said at least two of the pilot sub-carriers included in each of the groups.

5. A radio receiver comprising:
a receiving part receiving an input signal that includes data sub-carriers and pilot sub-carriers; and
a phase tracking circuit receiving the input signal, the phase tracking circuit including:
a divider configured to divide a symbol of the input signal into groups so that each of the groups includes at least one of the pilot sub-carriers; and
a corrector configured to correct phases of data sub-carriers of the input signal included in one of the groups on the basis of an amount of phase rotation of said at least one of the pilot sub-carriers included in said one of the groups.

6. The radio receiver according to claim 5, wherein the divider divides the symbol of the input signal into groups so that each of the groups includes one of the pilot sub-carriers.

7. The radio receiver according to claim 5, wherein the divider divides the symbol of the input signal into groups so that each of the groups includes at least two of the pilot sub-carriers.

8. The radio receiver according to claim 7, wherein the corrector corrects the phases of the data sub-carriers on the basis of an averaged amount of phase rotations of said at least two of the pilot sub-carriers included in each of the groups.

9. A signal processing method executed by a computer comprising:
   dividing a symbol of an input signal that includes data sub-carriers and pilot sub-carriers into groups so that each of the groups includes at least one of the pilot sub-carriers; and
   correcting phases of data sub-carriers of the input signal included in one of the groups on the basis of an amount of phase rotation of said at least one of the pilot sub-carriers included in said one of the groups.

10. The signal processing method according to claim 9, wherein dividing the symbol of the input signal includes dividing the symbol into groups so that each of the groups includes one of the pilot sub-carriers.

11. The signal processing method according to claim 9, wherein dividing the symbol of the input signal includes dividing the symbol into groups so that each of the groups includes at least two of the pilot sub-carriers.

12. The signal processing method according to claim 11, wherein correcting phases of data sub-carriers includes correcting the phases of the data sub-carriers on the basis of an averaged amount of phase rotations of said at least two of the pilot sub-carriers included in each of the groups.

13. A non-transitory computer readable medium storing a program causing a computer to execute a process for signal processing, the process comprising:
   dividing a symbol of an input signal that includes data sub-carriers and pilot sub-carriers into groups so that each of the groups includes at least one of the pilot sub-carriers; and
   correcting phases of data sub-carriers of the input signal included in one of the groups on the basis of an amount of phase rotation of said at least one of the pilot sub-carriers included in said one of the groups.

* * * * *